US012695860B2

(12) United States Patent
Cohen et al.

(10) Patent No.: US 12,695,860 B2
(45) Date of Patent: Jul. 28, 2026

(54) SYSTEMS AND METHODS FOR SPECIFYING CONFIGURATIONS OF AN ELECTRONIC DEVICE

(71) Applicant: Apple Inc., Cupertino, CA (US)

(72) Inventors: David Cohen, Longmont, CO (US); Srinivas Vedula, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 18/610,159

(22) Filed: Mar. 19, 2024

(65) Prior Publication Data

US 2024/0323340 A1     Sep. 26, 2024

Related U.S. Application Data

(60) Provisional application No. 63/491,283, filed on Mar. 20, 2023.

(51) Int. Cl.
*H04N 13/327*     (2018.01)
*G06F 3/01*     (2006.01)

(52) U.S. Cl.
CPC .......... *H04N 13/327* (2018.05); *G06F 3/013* (2013.01); *G06F 3/017* (2013.01)

(58) Field of Classification Search
None
See application file for complete search history.

(56) References Cited

U.S. PATENT DOCUMENTS

| | | | |
|---|---|---|---|
| 7,725,716 B2 | 5/2010 | Tidwell et al. | |
| 9,137,014 B2 | 9/2015 | Herbach et al. | |
| 9,740,832 B2 | 8/2017 | Shi | |
| 9,977,496 B2 * | 5/2018 | Maltz .................. | G06F 3/04845 |
| 10,509,463 B2 | 12/2019 | Cuervo et al. | |
| 10,698,743 B2 * | 6/2020 | Studnicka ........... | G06F 3/04817 |
| 10,783,269 B1 | 9/2020 | Shraer et al. | |
| 11,177,836 B1 * | 11/2021 | Thantharate ...... | H04M 1/72454 |
| 11,334,157 B1 * | 5/2022 | Gong ...................... | G06F 3/017 |
| 11,348,369 B2 * | 5/2022 | Wu .......................... | A61B 3/14 |
| 11,678,016 B1 | 6/2023 | Antony et al. | |
| 11,884,235 B2 * | 1/2024 | Bielby .................. | B60R 25/241 |
| 12,058,301 B2 * | 8/2024 | Jansen dos Reis .. | H04N 13/128 |
| 2007/0220009 A1 | 9/2007 | Morris et al. | |
| 2010/0214243 A1 | 8/2010 | Birnbaum et al. | |

(Continued)

FOREIGN PATENT DOCUMENTS

| | | |
|---|---|---|
| CN | 111385627 B | 12/2022 |
| KR | 102668753 B1 | 5/2024 |

(Continued)

OTHER PUBLICATIONS

Deng et al., "Edge Intelligence: The Confluence of Edge Computing and Artificial Intelligence", IEEE Internet of Things Journal, vol. 7, No. 8, Aug. 2020, pp. 7457-7469.

(Continued)

*Primary Examiner* — Talha M Nawaz

(74) *Attorney, Agent, or Firm* — Kubota & Basol LLP

(57)     ABSTRACT

An electronic device operates using first registration data while a first user is using the device and operates using second registration data while a second user is using the device. The owner of the electronic device can permit the electronic device to receive second registration data from an electronic device that is associated with the second user.

18 Claims, 4 Drawing Sheets

300

(56) References Cited

U.S. PATENT DOCUMENTS

| | | | | |
|---|---|---|---|---|
| 2011/0276803 | A1 | 11/2011 | Bender et al. | |
| 2013/0305354 | A1 | 11/2013 | King et al. | |
| 2014/0089278 | A1 | 3/2014 | Lovinger et al. | |
| 2014/0283012 | A1 | 9/2014 | Eggerton et al. | |
| 2015/0079933 | A1 | 3/2015 | Smith et al. | |
| 2015/0113631 | A1 | 4/2015 | Lerner et al. | |
| 2015/0193982 | A1* | 7/2015 | Mihelich | H04W 4/026 |
| | | | | 345/633 |
| 2016/0103998 | A1 | 4/2016 | Tredoux et al. | |
| 2016/0173499 | A1 | 6/2016 | Bianchi et al. | |
| 2016/0232336 | A1 | 8/2016 | Pitschel et al. | |
| 2017/0277876 | A1* | 9/2017 | Alameh | G06F 21/32 |
| 2018/0088795 | A1 | 3/2018 | Van Os et al. | |
| 2018/0288030 | A1 | 10/2018 | Witrisna et al. | |
| 2018/0293249 | A1* | 10/2018 | Tabares | H04W 4/023 |
| 2019/0147662 | A1* | 5/2019 | Nicholas | G06T 19/006 |
| | | | | 345/419 |
| 2019/0158593 | A1 | 5/2019 | Sloane et al. | |
| 2019/0319932 | A1 | 10/2019 | Kandregula | |
| 2020/0021567 | A1 | 1/2020 | Salgaonkar et al. | |
| 2020/0367054 | A1 | 11/2020 | Obaidi | |
| 2020/0389460 | A1 | 12/2020 | Carbune et al. | |
| 2021/0034725 | A1 | 2/2021 | Donley et al. | |
| 2021/0045169 | A1* | 2/2021 | Pupakdee | H04W 12/50 |
| 2021/0109836 | A1 | 4/2021 | Cranfill et al. | |
| 2021/0203747 | A1 | 7/2021 | Gorsica et al. | |
| 2021/0204115 | A1 | 7/2021 | Gorsica et al. | |
| 2022/0237148 | A1 | 7/2022 | Perlman et al. | |
| 2022/0269333 | A1 | 8/2022 | Dedonato et al. | |
| 2024/0061547 | A1 | 2/2024 | Fleizach et al. | |
| 2024/0094528 | A1* | 3/2024 | Edwin | G02B 27/0081 |
| 2024/0220145 | A1 | 7/2024 | Vedula | |
| 2024/0223553 | A1 | 7/2024 | Vedula et al. | |
| 2024/0281235 | A1 | 8/2024 | Huang et al. | |
| 2024/0330491 | A1 | 10/2024 | Mittal et al. | |
| 2024/0330498 | A1 | 10/2024 | Cohen et al. | |
| 2024/0333719 | A1 | 10/2024 | Cohen | |

FOREIGN PATENT DOCUMENTS

| | | | |
|---|---|---|---|
| WO | 2016000098 | A1 | 1/2016 |
| WO | 2018059934 | A1 | 4/2018 |

OTHER PUBLICATIONS

Du et al., "MEC-Assisted Immersive VR Video Streaming over Terahertz Wireless Networks: A Deep Reinforcement Learning Approach", IEEE Internet of Things Journal, vol. 7, No. 10, Oct. 2020, pp. 9517-9529.

Garriss et al., "Trustworthy and Personalized Computing on Public Kiosks", MobiSys'08, Breckenridge, Colorado, USA, Jun. 17-20, 2008, pp. 199-210.

Li, Yong, "Enhancing Mobile Capacity through Generic and Effcient Resource Sharing", TRACE: Tennessee Research and Creative Exchange, Doctoral Dissertations, Dec. 2018, 112 pages.

Liu et al., "Cutting the Cord: Designing a High-quality Untethered VR System with Low Latency Remote Rendering", MobiSys'18, Munich, Germany, Jun. 10-15, 2018, pp. 68-80.

Microsoft, "Lock Your Windows PC Automatically When You Step Away From It", Available online at: <https://support.microsoft.com/en-us/windows/lock-your-windows-pc-automatically-when-you-step-away-from-it-d0a5f536-74ac-0859-820a-4140dac9fcaf>, [retrieved on Mar. 28, 2024], 3 pages.

Non-Final Office Action received for U.S. Appl. No. 18/353,038, mailed on Mar. 27, 2025, 12 pages.

International Search Report received for PCT Patent Application No. PCT/US2024/020606, mailed on Jun. 13, 2024, 5 pages.

Non-Final Office Action received for U.S. Appl. No. 18/397,902, mailed on Mar. 14, 2025, 55 pages.

Microsoft® Computer Dictionary, Fifth Edition, accessed via Google search on wordpress.com, 2002, pp. 154, 470.

Extended European Search Report received for European Patent Application No. 24166984.5, mailed on Aug. 12, 2024, 8 pages.

Extended European Search Report received for European Patent Application No. 24167059.5, mailed on Aug. 12, 2024, 8 pages.

International Search Report received for PCT Patent Application No. PCT/US2023/086084, mailed on Mar. 20, 2024, 4 pages.

International Search Report received for PCT Patent Application No. PCT/US2023/086401, mailed on Apr. 26, 2024, 4 pages.

Apple, "Approve What Kids Buy With Ask to Buy", Apple Support, Available online at <https://support.apple.com/en-us/HT201089>, [Retrieved from Internet on Aug. 20, 2024], 6 pages.

Apple, "Set up Family Sharing", Apple Support, Available online at <https://support.apple.com/en-us/HT201088>, [Retrieved from Internet on Aug. 20, 2024], 6 pages.

Pattison, Sandra, "How to Put Parental Controls on iPhone and iPad in 2024", Cloudwards, Available online at <https://www.cloudwards.net/parent-controls-on-iphone/#:~:text=Can%20I%20Control%20My%20Child%27s,for%20your%20child%27s%20iOS%20device>, [Retrieved from Internet on Aug. 20, 2024], 35 pages.

Non-Final Office Action received for U.S. Appl. No. 18/611,432, mailed on Sep. 23, 2025, 12 pages.

Final Office Action received for U.S. Appl. No. 18/353,038, mailed on Nov. 4, 2025, 15 pages.

Non-Final Office Action received for U.S. Appl. No. 18/611,444, mailed on Jul. 23, 2025, 6 pages.

Non-Final Office Action received for U.S. Appl. No. 18/611,431, mailed on Aug. 8, 2025, 8 pages.

Notice of Allowance received for U.S. Appl. No. 18/611,444, mailed on Nov. 4, 2025., 8 pages.

Zhou, et al., "Development and Research of Root File System Based on Cortex-A8 Microprocessor", Atlantis Press, Proceedings of the 2018 International Conference on Information Technology and Management Engineering (ICITME 2018), vol. 148, Aug. 2018, pp. 13-16.

* cited by examiner

200

300

SYSTEMS AND METHODS FOR SPECIFYING CONFIGURATIONS OF AN ELECTRONIC DEVICE

CROSS-REFERENCE TO RELATED APPLICATIONS

This application claims the benefit of U.S. Provisional Application No. 63/491,283, filed Mar. 20, 2023, the contents of which are incorporated herein by reference in its entirety for all purposes.

FIELD OF THE DISCLOSURE

Aspects of the present disclosure relate to operating an electronic device with user-specific configurations.

BACKGROUND OF THE DISCLOSURE

Electronic devices may include settings and configurations that can be customized differently for different users.

SUMMARY OF THE DISCLOSURE

Aspects of the present disclosure relate to operating an electronic device with user-specific configurations. In some embodiments, an electronic device uses user registration data to customize performance of one or more functions. In some situations, a user of an electronic device may wish to allow a different user to use the electronic device with configurations specific to the other user. In some embodiments, the electronic device receives user registration data from another electronic device that is specific to the other user. For example, while the other user is using the electronic device, the electronic device operates using the user registration data specific to the other user.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Aspects of the present disclosure relate to operating an electronic device with user-specific configurations. In some embodiments, an electronic device uses user registration data to customize performance of one or more functions. In some situations, a user of an electronic device may wish to allow a different user to use the electronic device with configurations specific to the other user. In some embodiments, the electronic device receives user registration data from another electronic device that is specific to the other user. For example, while the other user is using the electronic device, the electronic device operates using the user registration data specific to the other user.

Figure 1:
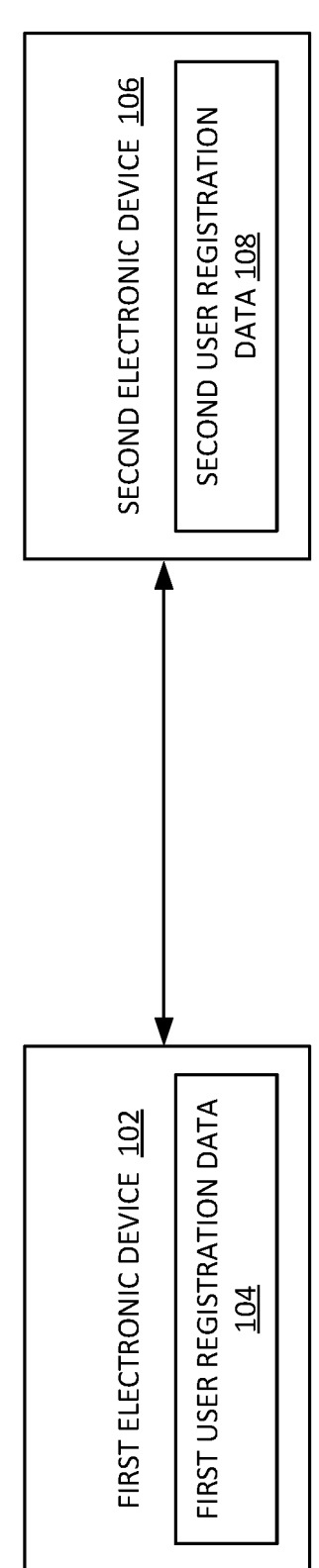
FIG. 1 illustrates an example system including a first electronic device and a second electronic device in accordance with some embodiments of the disclosure.

FIG. 1 illustrates an example system 100 including a first electronic device 102 and a second electronic device 106 in accordance with some embodiments of the disclosure. Example electronic devices include mobile devices (e.g., smartphones, media players, and/or tablets), computers (e.g., laptop and/or desktop computers), set top boxes, smart speakers, and/or wearable devices (e.g., smart watches and/or head-mounted display devices). In some embodiments, the first electronic device 102 and the second electronic device 106 are in communication with each other via a network connection, such as a wireless network connection that facilitates transmitting data between the first electronic device 102 and the second electronic device 106.

In some embodiments, while the first user of the first electronic device 102 is using the first electronic device 102, the first electronic device 102 performs operations in accordance with first user registration data 104. For example, the first electronic device 102 is associated with a user account of the first user. In some embodiments, the first user registration data 104 includes eye data, hand data, an avatar, accessibility settings, and/or audio output settings associated with, and obtained with permission from, the first user. As described in more detail below with reference to FIG. 2A, the first electronic device 102 customizes performance of various operations based on the first user registration data 104. In some embodiments, the first electronic device 102 stores the first user registration data 104 using memory of the first electronic device 102, as described in more detail below with reference to FIG. 4.

In some situations, a second user of the second electronic device 106 may wish to use the first electronic device 102. For example, the second electronic device 106 is associated with a user account of the second user. In some embodiments, the first electronic device 102 enhances the user experience of the second user by operating in accordance with second user registration data 108 associated with the second user while the second user is using the first electronic device 102. In some embodiments, the second user registration data 108 includes eye data, hand data, an avatar, accessibility settings, and/or audio output settings associated with, and obtained with permission from, the second user.

In some situations, the first electronic device 102 does not have the second user registration data 108 stored in memory of the first electronic device 102 when the second user wishes to use the first electronic device 102. As described in more detail below with reference to FIG. 3, in response to a request to configure the first electronic device 102 for use by the second user, the second electronic device 106 transfers the second user registration data 108 to the first electronic device 102 for use by the first electronic device 102 while the second user is using the first electronic device 102.

In some embodiments, if the second electronic device 106 does not have the second user registration data 108, the first electronic device 102 creates the second user registration data 108. For example, creating the second user registration data 108 includes performing an eye calibration, performing a hand calibration, performing an ear calibration, creating an avatar, and/or adjusting one or more accessibility or other settings, as described in more detail below with reference to FIG. 3.

In some embodiments, after the first electronic device 102 creates the second user registration data 108, the first electronic device 102 transmits the second user registration data 108 to the second electronic device 106 and the second electronic device 106 stores the second user registration data. For example, the first electronic device 102 transmits the second user registration data 108 to the second electronic device 106 after the second user registration data 108 is created and before the second user concludes their session using the first electronic device 102. As another example, the first electronic device 102 transmits the second user registration data 108 to the second electronic device 106 at the conclusion of the second user's session using the first electronic device 102, such as when the second user removes a wearable component of the first electronic device 102 (e.g., a head-mounted display) from their body and/or when the first electronic device 102 receives a request to operate in the mode configured for the first user. As another example, in response to receiving an input requesting to end the session of use of the first electronic device 102 by the second user, the first electronic device 102 presents a prompt instructing the user to bring the second electronic device 106 within a threshold distance of the first electronic device 102 to have the first electronic device 102 transfer the registration data 108 of the second user to the second electronic device 106. For example, the threshold distance is 1-10 centimeters. As another example, the first electronic device 102 presents a prompt instructing the user to capture an image or code displayed by the second electronic device 106 to save the registration data 108 of the second user to the second electronic device 106.

Thus, in some embodiments, the first electronic device 102 is able to transition between operating in a mode configured for the first user that includes operating according to the first user registration data 104 and operating in a mode configured for the second user that includes operating according to the second user registration data 108. In some embodiments, while operating in the mode configured for the second user, the first user's data including the first user registration data 104, files, passwords, and/or messaging conversations are hidden and/or not accessible to the second user to preserve user privacy. In some embodiments, operating in the mode configured for the second user includes receiving additional data from the second electronic device 106, such as files, passwords, and/or messaging conversations, and accessing the data for the second user. In some embodiments, the second user's data is encrypted, hidden, or deleted from the first electronic device 102 while the first electronic device 102 operates in the mode configured for the first user.

Additionally or alternatively in some embodiments, if the first electronic device 102 does not receive the second user registration data 108 from the second electronic device 106, the first electronic device 102 uses default user registration data while the second user is using the first electronic device 102. In some examples, the default user registration data includes default eye calibration data, default hand calibration data, a default avatar, default accessibility settings, and/or default audio output settings. In some embodiments, the first electronic device 102 initially uses default eye registration data and no hand registration data prior to receiving or creating eye and hand registration data for the second user. For example, the first electronic device displays images according to the default eye registration data and receives input using a hardware input device while using no hand registration data. In this example, once the hand registration data for the second user is received or generated, the first electronic device 102 receives inputs using the second user's hand registration data and based on detecting the second user's hands. In some embodiments, while the second user is using the first electronic device 102, the first electronic device 102 uses default data for some of the registration data and second user registration data 108 specific to the second user for some of the registration data. For example, the first electronic device 102 uses eye calibration data and a user avatar that are specific to the second user and uses default hand calibration data, accessibility settings, and audio output settings while the second user is using the first electronic device 102. In some embodiments, the second user can start using the first electronic device 102 with default data for one or more types of user registration data and create customized user registration data later. In some embodiments, as the second user creates and/or updates second user registration data 108, the first electronic device 102 transmits the new and/or updated second user registration data 108 to the second electronic device 106. In some embodiments, the first electronic device 102 transmits the second user registration data 108 to the second electronic device 106 immediately after creating and/or updating the second user registration data 108. In some embodiments, the first electronic device 102 transmits the second user registration data 108 to the second electronic device 106 at the conclusion of the second user's session with the first electronic device 102, as mentioned above and described in more detail below with reference to FIG. 3.

Figure 2:
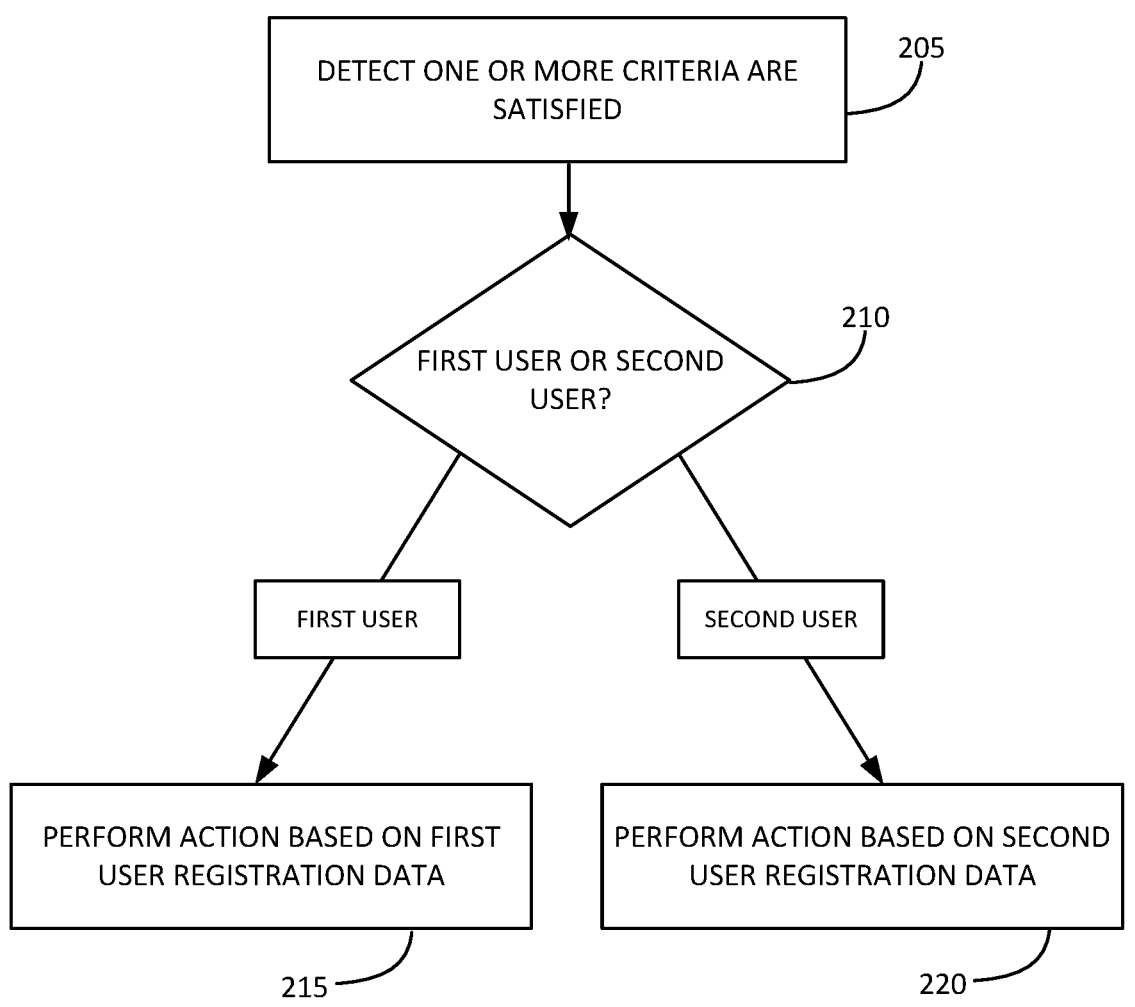
FIG. 2 is a block diagram illustrating an example method of using registration data to perform operations customized for the user that is using the first electronic device according to some embodiments of the disclosure.

FIG. 2 is a block diagram illustrating an example method 200 of using registration data to perform operations customized for the user that is using the first electronic device 102 according to some embodiments of the disclosure. In some embodiments, the first electronic device 102 described above with reference to FIG. 1 performs method 200. In some embodiments, method 200 can be used to customize performance of various operations using user registration data corresponding to the user that is currently using the first electronic device.

In some embodiments, at block 205, the first electronic device 102 detects that one or more criteria for performing a respective operation are satisfied. For example, the first device 102 detects movement of the hands of the user that is currently using the first electronic device 102. In this example, in response to detecting the movement of the hands, the first electronic device 102 processes the hand movement as an input. In some embodiments, at block 210, the first electronic device 102 determines whether the first electronic device 102 is being used by the first user or the second user. In some embodiments, in accordance with a determination that the first electronic device 102 is being used by the first user, at block 215 the first electronic device 102 performs the action based on the first user registration data 104. For example, the first electronic device 102 processes the input provided by the user's hand movement using the first user's hand calibration data included in the first user registration data 104. In some embodiments, in accordance with a determination that the first electronic device 102 is being used by the second user, at block 220 the first electronic device 102 performs the action based on the second user registration data 108. For example, the first electronic device 102 processes the input provided by the user's hand movement using the second user's hand calibration data included in the second user registration data 108 or using default settings for hand gesture inputs.

In some embodiments, the first electronic device 102 uses method 200 to adjust the operation of a display integrated with or in communication with the first electronic device 102. For example, depending on which user is using the first electronic device 102, the first electronic device 102 can adjust the display components based on a pupillary distance of the user. In some embodiments, the first electronic device 102 executes instructions to display image(s) using the display at block 205. In some embodiments, in accordance with a determination that the first user is using the first electronic device 102 at block 210, the first electronic device 102 adjusts the display based on display calibration settings for the first user at block 215. In some embodiments, in accordance with a determination that the second user is using the first electronic device 102 at block 210, the first electronic device 102 adjusts the display based on display calibration settings for the second user at block 210.

In some embodiments, the first electronic device 102 uses method 200 to customize operations for each user while running a pass-and-play game application. In some embodiments, while running the pass-and-play game application, when it is the first user's turn to use the first electronic device 102 to play the game, the first electronic device 102 configures the game user interface for the first user and operates using the first user registration data 104. In some embodiments, while running the pass-and-play game application, when it is the second user's turn to use the first electronic device 102 to play the game, the first electronic device 102 configures the game user interface for the second user and operates using the second user registration data 108. For example, at block 205, the electronic device 102 detects an input directed to the gaming application. At block 210, the electronic device 102 determines whether it is the first user's turn in the game or the second user's turn in the game, for example. In some embodiments, if it is the first user's turn, the electronic device 102 uses the first user registration data 104 to process the input in the gaming application and performs actions for the first user's turn at block 215. In some embodiments, if it is the second user's turn, the electronic device 102 uses the second user registration data 108 to process the input in the gaming application and performs actions for the second user's turn at block 220.

In some embodiments, the first electronic device 102 uses method 200 to customize operations for each user during a communication session, such as a video call or augmented reality (AR) or virtual reality (VR) communication session. For example, an AR communication session or VR communication session includes displaying an avatar associated with the user that is using the first electronic device 102 to participate in the communication session. In some embodiments, the first electronic device 102 captures images and/or video of the user using the first electronic device 102, and generates an animation of the avatar of the user performing the movements, facial expressions, so forth, of the user for display by the other electronic device(s) participating in the communication session. For example, the first electronic device 102 detects that the communication session is in progress at block 205. In some embodiments, at block 210, the first electronic device 102 detects which user is using the first electronic device 102 to participate in the communication session. In some situations, the user is the same for the duration of the communication session. In some situations, the user changes during the communication session. In some situations, both users participate in the communication session. For example, the first user wears a head mounted display during the communication session and captures images and/or video of portions of the first user and captures images and/or video of the second user in the physical environment of the head mounted display. In some embodiments, at block 215, in accordance with a determination that the first user is participating in the communication session, the first electronic device 102 uses the first user registration data 104 to conduct the communication session. For example, the first electronic device 102 processes inputs using first user calibration data included in the first user registration data 104 and/or presents an avatar of the first user. In some embodiments, at block 220, in accordance with a determination that the second user is participating in the communication session, the first electronic device 102 uses the second user registration data 108 to conduct the communication session. For example, the first electronic device 102 processes inputs using second user calibration data included in the second user registration data 108 and/or presents an avatar of the second user.

In some embodiments, additional and alternative uses for method 200 are possible. For example, the first electronic device 102 performs method 200 when the second user borrows the first electronic device 102 from the first user. In some embodiments, generally speaking, the first electronic device 102 uses method 200 to operate using the first user registration data 104 while the first user is using the first electronic device 102 and to operate using the second user registration data 108 when the second user is using the first electronic device 102.

Figure 3:
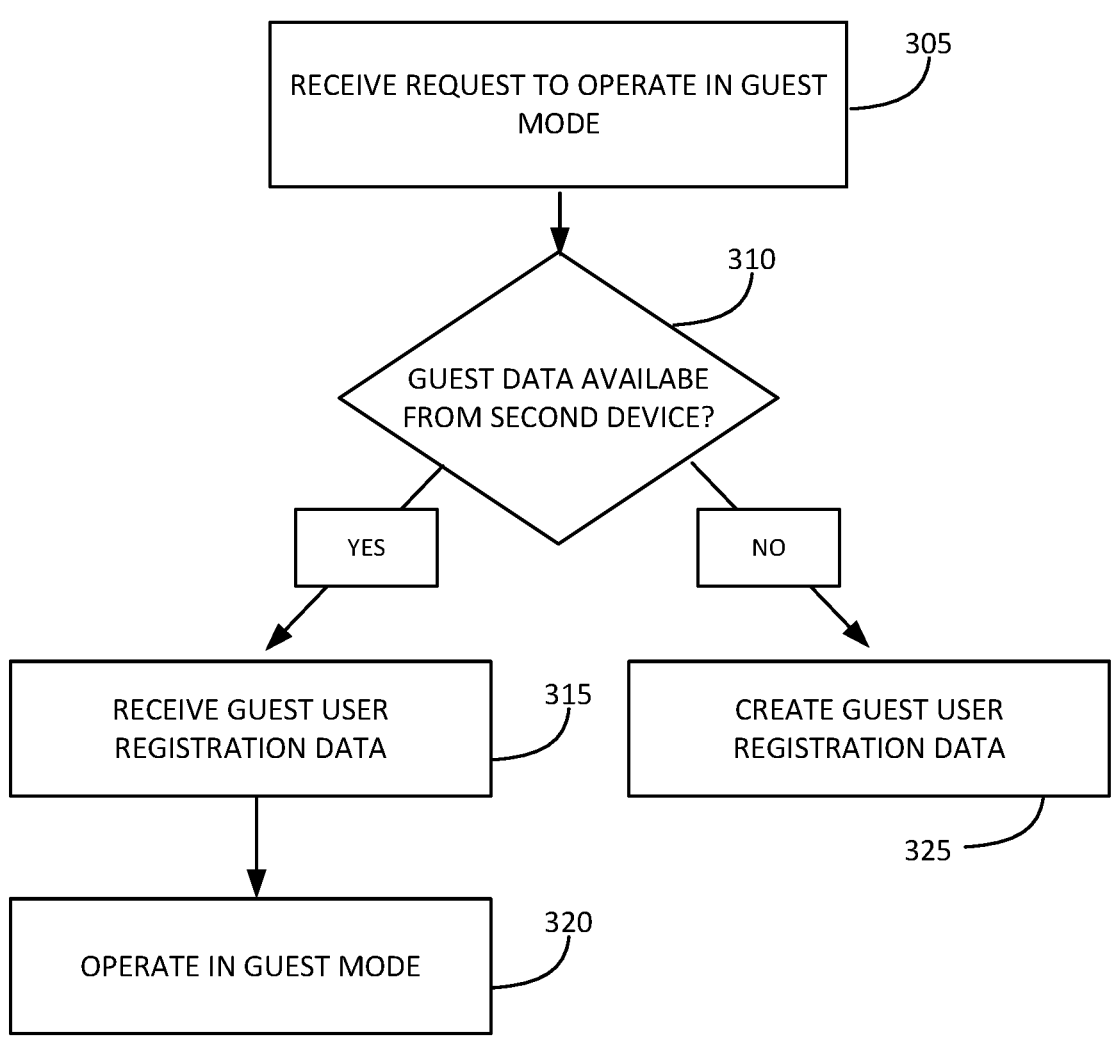
FIG. 3 illustrates an example method of transitioning into a guest access mode of an electronic device according to embodiments of the disclosure.

FIG. 3 illustrates an example method 300 of transitioning into a guest access mode of an electronic device according to embodiments of the disclosure. In some embodiments, the first electronic device 102 described above with reference to FIG. 1 performs method 300. In some embodiments, "guest access mode" or "guest mode" refer to a mode of operation in which the first electronic device 102 uses user registration data other than the user registration data of the user account associated with or logged into the first electronic device 102 to perform operations. For example, the first electronic device 102 is associated with the user account of the first user and generally uses the first user registration data 104 to perform operations outside of guest mode and while operating in guest mode, the first electronic device 102 uses user registration data other than the first user registration data 104 to perform operations. For example, during guest mode, the first electronic device 102 uses the second user registration data 108 or default user registration data to perform operations.

In some embodiments, at block 305, the first electronic device 102 receives a request to operate in guest mode (e.g., operating with the second configuration or, more generally, operating configured for a user other than the first user). In some embodiments, receiving the request includes receiving a user input requesting to enter the guest access mode and/or requesting that the first electronic device 102 configures itself for use by another user, such as the second user. In some embodiments, receiving the request includes detecting particular criteria and/or operating conditions, such as detecting that it is another user's turn in a pass-and-play game application. In some embodiments, receiving the request includes receiving an indication from the second electronic device 106 that the second user wishes to use the first electronic device 102 in a mode configured for the second user. In some embodiments, in response to receiving a request from the second electronic device 106, the first electronic device 102 presents a prompt to the first user requesting confirmation to enter the guest mode.

In some embodiments, the first electronic device 102 receives the request to operate in guest mode while the first user of the first electronic device 102 is operating the first electronic device 102 outside of guest mode. The first user optionally configures one or more settings for a session of use of the first electronic device 102 in guest mode. These settings optionally include selecting whether the guest user should have access to the first electronic device 102 in the guest mode for additional sessions without express setup by the first user. For example, if the first electronic device 102 is configured not to allow additional sessions without express setup by the first user, at the conclusion of the session of use in the guest mode, the first electronic device 102 will lock and the first user will need to configure guest mode again for the second user to access the first electronic device 102. As another example, if the first electronic device 102 is configured to allow additional sessions without express setup by the first user, at the conclusion of the session of use in the guest mode, the first electronic device 102 will allow the second user to unlock the first electronic device 102 to operate the first electronic device 102 in the guest mode without configuration by the first user. For example, upon startup, such as a user wearing a wearable component (e.g., headset) of the first electronic device 102, the first electronic device 102 presents an option to start the first electronic device 102 in guest mode. In this example, the first electronic device 102 optionally authenticates the guest based on a connection to the second electronic device 106, an image of the second user, and/or a password or passcode associated with the second user and, in response to successful authentication, starts up in the guest mode.

In some embodiments, at block 310, the first electronic device 102 determines whether user registration data for the guest user is available from another electronic device, such as an electronic device associated with a user account of the guest user. For example, the first electronic device 102 determines whether the second user registration data 108 is available from the second electronic device 106. The first electronic device 102 optionally broadcasts a signal to nearby devices to request enrollment data for use in the guest mode. In some embodiments, the first electronic device 102 and the other electronic device (e.g., the second electronic device 106) are in communication with each other wirelessly, such as via Bluetooth, Wi-Fi, and/or near-field communication (NFC). In some embodiments, the first electronic device 102 presents a prompt instructing the second user to bring their second electronic device 106 within a threshold distance of the first electronic device 106 to transfer the data as described in more detail below at block 315.

In some embodiments, at block 315, in accordance with a determination that the guest data is available from the other electronic device (e.g., "Yes" at block 310), the first electronic device 102 receives the guest user registration data from the other electronic device. For example, the first electronic device 102 receives the second user registration data 108 from the second electronic device 106. In some embodiments, the first electronic device 102 receives the second user registration data 108 using a wireless communication protocol listed above.

In some embodiments, the transfer of the guest user registration data is initiated in response to an interaction between the first electronic device 102 and the other electronic device. For example, the first electronic device 102 detects the second electronic device 106 touching the first electronic device 102 in a tap, bump, or sustained contact (e.g., for 0.1, 0.2, 0.3, 0.5, 1, 2, or 3 seconds). In some embodiments, the interaction is interaction with a user interface displayed on a touch-sensitive display in communication with (e.g., integrated with) the second electronic device 106, or another interaction with a user interface displayed by the second device 106. In some embodiments, the second electronic device 106 presents an indication for capture by the first electronic device 102, such as the second electronic device 106 displaying a visual indication (e.g., an image, such as a QR code, bar code, or alphanumeric code) that is captured by a camera of the first electronic device 102. As another example, the second electronic device 106 plays a sound that is captured by a microphone of the first electronic device 102.

In some embodiments, at block 320, the first electronic device 102 operates in guest mode, including using the second user registration data 108 to perform actions, as described in more details above with reference to FIGS. 1 and 2. In some embodiments, at the conclusion of guest mode, the first electronic device 102 transfers updated second user registration data 108 to the second electronic device 106. In some embodiments, additionally or alternatively, at the conclusion of guest mode, the first electronic device 102 deletes the second user registration data 108 from the memory of the first electronic device 102.

In some embodiments, at block 325, in accordance with a determination that the guest data is not available from the second electronic device (e.g., "No" at block 310), the first electronic device 102 creates guest user registration data. In some embodiments, creating the guest user registration data includes undergoing one or more calibration processes to generate hand data and/or eye data specific to the guest user of the first electronic device 102. For example, hand data calibration includes capturing one or more images or videos of the user's hands while the user performs one or more predefined hand gestures. As another example, eye data calibration includes measuring the pupillary distance of the user with one or more cameras and/or receiving information about a vision prescription of the user. In some embodiments, creating the guest user registration data includes creating an avatar of the guest user. In some embodiments, creating the guest user registration data includes adjusting accessibility settings of the first electronic device. In some embodiments, after creating the guest user registration data, the first electronic device 102 transmits the guest user registration data to a second electronic device 106 associated with a user account of the guest user. For example, the first electronic device 102 transmits the guest user registration data to the second electronic device 106 at the conclusion of the session of use in the guest mode. Optionally, the first electronic device 102 transmits the user registration data for the second user to the second electronic device 106 in response to detecting the second electronic device 106 within a threshold distance of the first electronic device 102, such as during a tap, bump, or sustained contact described herein. The first electronic device 102 optionally presents a prompt instructing the second user to bring the second electronic device 106 within the threshold distance of the first electronic device 102 to transfer the user registration data. Optionally, before transferring the registration data, the first electronic device 102 captures a code or image presented by the second electronic device 106 to confirm which device to transfer the user registration data to.

In some embodiments, after creating the guest user registration data, the first electronic device 102 operates in the guest mode using the guest user registration data as described above with reference to block 320. In some embodiments, at the conclusion of operating in guest mode, the first electronic device 102 transmits the guest user registration data to the second electronic device 106. In some embodiments, the first electronic device 102 concludes operating in guest mode in response to receiving a user input (e.g., from the guest user) indicating conclusion of guest access to the first electronic device 102. In some embodiments, the first electronic device 102 concludes operating in guest mode in response to the second user removing a wearable component of the first electronic device 102 from their body, such as a head-mounted display.

In some embodiments, in accordance with the determination that guest data is not available from the second electronic device 106 (e.g., "No" at block 310), the first electronic device 102 operates in guest mode using default user data. In some embodiments, the default user data includes default hand and/or eye calibration data, a default avatar, and/or default accessibility settings. In some embodiments, while operating using the default user data, the first electronic device 102 creates guest user registration data according to the details of block 325. For example, the first electronic device 102 initially operates in guest mode using the default user data and creates portions of guest user data in response to receiving one or more user requests to create customized data. For example, while the first electronic device 102 does not have registration data for the second user, the first electronic device 102 uses default eye data to display images, does not use hand registration data for inputs, and receives inputs using a hardware input device. In some embodiments, the first electronic device 102 operates in guest mode using a mix of default user registration data and custom user registration data.

Figure 4:
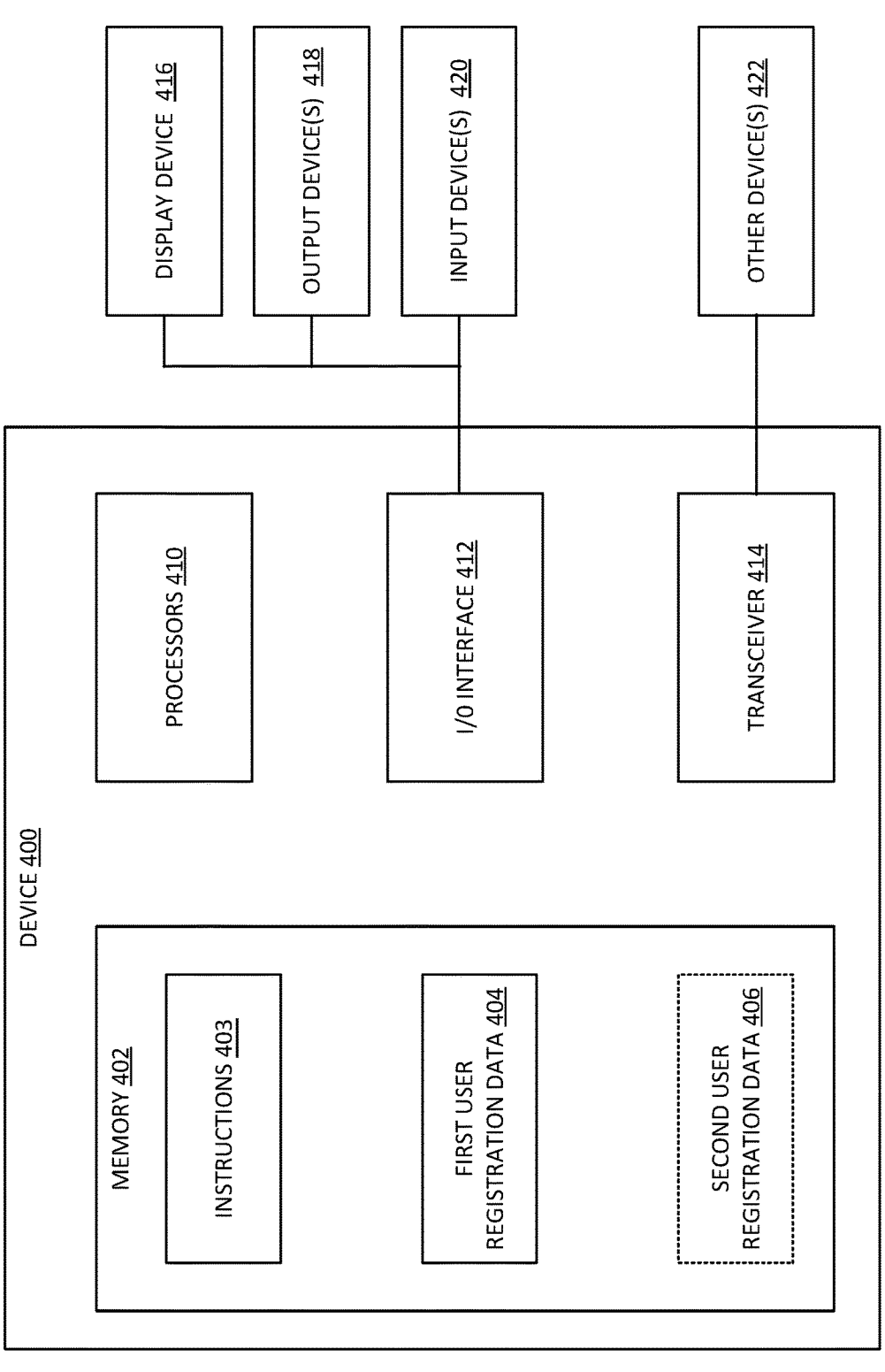
FIG. 4 is a block diagram of an example electronic device according to some embodiments of the disclosure.

FIG. 4 is an example block diagram of an electronic device 400 according to some embodiments of the disclosure. In some embodiments, the electronic device 400 includes memory 402, one or more processors 410, an I/O interface 412, and a transceiver 414. In some embodiments, the electronic device 400 includes additional or alternative components. In some embodiments, first electronic device 102 and/or second electronic device 106 are of the same architecture as electronic device 400. In some embodiments, first electronic device 102 and/or second electronic device 106 include more, fewer, or different components than shown in the architecture as electronic device 400.

In some embodiments, memory 402 of electronic device 400 includes volatile and/or non-volatile memory implemented using electronic, electromagnetic, magnetic, infrared, optical, and/or semiconductor system(s) and/or device(s). Examples of suitable memory circuitry include random access memory (RAM) devices (e.g., static random-access memory (SRAM), double-data-rate random-access memory (DDR RAM), dynamic random-access memory (DRAM), or other high-speed RAM or solid-state RAM, etc.), flash memory devices, read-only memory (ROM) devices, or erasable or electrically erasable programmable read-only memory devices (EPROM or EEPROM). Other types of memory are possible in some embodiments. In some embodiments, memory 402 can be separate from the one or more other components of electronic device 400 and electrically coupled to the one or more other components of electronic device 400 for read and/or write operations. In some embodiments, some of memory 402 can be integrated within other components of electronic device 400.

In some embodiments, at least a portion of the memory 402 can be referred as a computer-readable storage medium. Memory 402 and/or a transitory or non-transitory computer readable storage medium of memory 402 can store instructions, programs, data structures and/or modules or a subset or combination thereof in some embodiments. In some embodiments, memory 402 and/or the computer readable storage medium can store instructions 403 and/or programs, which when executed by processors 410, can cause the electronic device 400 (or a computing system more generally) to perform one or more functions and methods of one or more examples of this disclosure, such as one or more of the methods described above with reference to FIGS. 1-3. As used herein, a "non-transitory computer-readable storage medium" includes any tangible medium (e.g., excluding signals) that can contain or store programs/instructions for use by the electronic device (e.g., processing circuitry), for example.

As shown in FIG. 4, additionally or alternatively, the memory 402 of electronic device 400 stores first user registration data 404 and/or second user registration data 406. In some embodiments, the electronic device 400 is an electronic device that customizes operations for different users using first user registration data 404 and/or second user registration data 406, such as the first electronic device 102. In some embodiments, the first user registration data 404 is associated with a user account of the electronic device 400. For example, first user registration data 404 is the same as or similar to first user registration data 104. In some embodiments, the electronic device 400 stores the first user registration data 404 while operating in a mode configured for a different user without deleting the first user registration data 404. In some embodiments, the second user registration data 406 is associated with a user account of an electronic device different from electronic device 400 and a user different from the primary user of the electronic device 400. For example, second user registration data 406 is the same as or similar to second user registration data 108. In some embodiments, the electronic device 400 stores the second user registration data 406 while operating in a mode configured for the user associated with the second user registration data 406 and optionally deletes the second user registration data 406 at the conclusion of guest access to the electronic device 400. In some embodiments, the electronic device 400 receives the second user registration data 406 from a second electronic device (e.g., optionally included in the other device(s) 422 in communication with electronic device 400) using transceiver 414.

In some embodiments, the electronic device 400 stores the first user registration data 404 associated with the user account of the electronic device 400 for use by other electronic devices in a manner similar to operations of the second electronic device 106 described above. In some embodiments, the electronic device 400 transmits the first user registration data 404 to another electronic device 422 using transceiver 414. In some embodiments, the electronic device 400 does not use the first user data 404 to operate the electronic device 400 and stores the first user data 404 so the user of the electronic device 400 is able to use the first user data 404 to operate other devices 422 in modes configured for the user of the electronic device 400.

In some embodiments, the electronic device 400 further includes one or more processors 410. Processors 410 can include graphics processing units (GPUs), central processing units (CPUs), microprocessors, microcontrollers, programmable logic device (PLD), field-programmable gate arrays (FPGAs), application specific integrated circuits (ASICs), digital signal processors (DSPs), or any suitable processing circuitry. The electronic device 400 can use processors 410 to perform any of the functions, processes, and/or methods described herein (e.g., optionally by executing instructions or programs stored in memory 402 and/or a non-transitory computer-readable storage medium).

In some embodiments, the electronic device 400 further includes an I/O interface 412. I/O interface 412 includes circuitry such as data lines, address lines, and control lines, for example, that enable communication between the electronic device 400 and one or more peripherals, such as display device 416, output device(s) 418, and input device(s) 420. Example display devices include, but are not limited to, monitors, television screens, touch screens, projectors, and/ or head mounted displays implemented with LCD (liquid crystal display), LED (light emitting diode), OLED (organic light emitting diode), and/or other technology. Examples of other output device(s) 418 include, but are not limited to audio output devices (e.g., wired and/or wireless speakers and/or headphones), tactile output devices (e.g., haptic and/ or vibration devices), and other visual output devices (e.g., indicator lights). Example input device(s) 420 include camera(s) (e.g., visible light cameras and/or infrared cameras), depth sensors (e.g., range sensors and/or LiDAR), trackpads, mouses, touch screens, microphones, keyboards, pedals, remote controls, and/or video game controllers.

In some embodiments, the electronic device 400 includes a transceiver 414. Transceiver 414 includes transmitter and/or receiver circuitry, including but not limited to signal generator(s), oscillator(s), modulator(s), encoder(s), amplifier(s), antenna(s), demodulator(s), filter(s), decoder(s), and/ or tuner(s), for example. In some embodiments, the transceiver 414 is configured to communicate with other device(s) 422 (e.g., including the second electronic device described above with reference to FIGS. 1-3) using one or more protocols, including but not limited to, Bluetooth, Wi-Fi, WiFi Direct, radio, cellular communication, satellite communication, and/or wired communication.

As described above, the components and configuration of components of electronic device 400 according to the disclosure are not limited by the example illustrated and described with reference to FIG. 4. In some embodiments, one or more of the components of the electronic device 400 included in FIG. 4 and any additional components of the electronic device 400 not shown in FIG. 4 are in communication with each other and/or integrated with each other. In some embodiments, additional or alternative components and/or configurations are possible.

Aspects of the disclosure relate to sharing user registration data between authorized electronic devices. Implementers should handle such user registration information while meeting or exceeding relevant industry and government regulations for user privacy. The present disclosure contemplates that a user should provide express permission for sharing registration information. Also, as discussed above, a device operating in guest mode can alternately provide default settings or require the guest user to reconfigure the device, when shared information is unavailable. As another example, owners of relevant devices can refrain from and/or opt-out of allowing guest usage, thereby rendering the transmission of guest registration information unnecessary. Further, the registration data being shared may be encrypted during transmission, and the electronic devices can maintain such information in a machine-readable format that is understood by the devices for purposes of device operation, and disallow the downloading of that information in a human readable or semantically meaningful format.

Some examples of the disclosure are directed to an electronic device, comprising: memory; one or more input devices; and one or more processors coupled to the memory and the one or more input devices, the one or more processors configured to: while operating in a mode configured for a first user, receive, using the one or more input devices, an input corresponding to a request to operate in a mode for another user; and determine whether user registration data for a second user, different from the first user, is available from a second electronic device; in accordance with a determination that user registration data for the second user is available from a second electronic device: receive, from the second electronic device, the user registration data for the second user; and operate in a mode configured for the second user using the registration data for the second user. Additionally or alternatively, in some examples, the one or more processors are further configured to: in accordance with a determination that the user registration data for the second user is not available from the second electronic device, creating the user registration data for the second user. Additionally or alternatively, in some examples, creating the user registration data for the second user includes sensing eye positions of the second user and calibrating a display using the sensed eye positions. Additionally or alternatively, in some examples, the one or more processors are further configured to transmitting the created user registration data for the second user to the second electronic device. Additionally or alternatively, in some examples, the registration data of the second user comprises data used to process hand gesture inputs, and operating in the mode configured for the second user includes detecting a hand gesture input using the data used to process the hand gesture inputs. Additionally or alternatively, in some examples, the electronic device further includes a display device coupled to the one or more processors, wherein the registration data of the second user includes pupil distance settings for the second user, and operating in the mode configured for the second user includes adjusting the display device based on the pupil distance settings for the second user. Additionally or alternatively, in some examples, the registration data of the second user includes an avatar of the second user, and operating in the mode configured for the second user includes using the avatar of the second user. Additionally or alternatively, in some examples, the registration data of the second user includes an accessibility setting, and operating in the mode configured for the second user includes operating with the accessibility setting. Additionally or alternatively, in some examples, the registration data of the second user comprises audio settings for the second user, and operating in the mode configured for the second user includes outputting audio, using one or more output devices, in accordance with the audio settings for the second user. Additionally or alternatively, in some examples, the memory stores one or more files, and operating in the mode configured for the first user includes accessing the one or more files, and operating in the mode configured for the second user includes restricting access to the one or more files. Additionally or alternatively, in some examples, transitioning between the mode configured for the first user and the mode configured for the second user occurs while a game application is running on the electronic device, and the one or more processors are further configured to, while running the game application on the electronic device: in accordance with a determination that it is the first user's turn in the game application, operating in the mode configured for the first user, and in accordance with a determination that it is the second user's turn in the game application, operating in the mode configured for the second user. Additionally or alternatively, in some examples, the electronic device further includes a wearable device and one or more sensors, wherein the one or more processors are further configured to: while operating in the mode configured for the first user, detecting, using the one or more sensors, removal of the wearable device from the second user; and in response to detecting removal of the wearable device from the second user, transition from operating in the mode configured for the second user to operating in the mode configured for the first user. Additionally or alternatively, in some examples, the electronic device further includes one or more sensors, wherein determining that the user registration data for the second user is available from the second electronic device includes detecting the second electronic device touching the electronic device. Additionally or alternatively, in some examples, determining that the user registration data for the second user is available from the second electronic device includes detecting the second electronic device using UWB. Additionally or alternatively, in some examples, the electronic device further includes one or more cameras coupled to the one or more processors, wherein determining that the user registration data for the second user is available from the second electronic device includes detecting, using a the one or more cameras, a predefined image displayed by the second electronic device. Additionally or alternatively, in some examples, the electronic device further includes one or more output devices and one or more input devices, wherein determining that the user registration data for the second user is available from the second electronic device includes outputting, using the one or more output devices, a first predetermined audio tone for detection by the second electronic device or detecting, using the one or more input devices, a second predetermined audio tone outputted by the second electronic device.

Some examples of the disclosure are directed to a method performed at an electronic device including memory, one or more input devices, and one or more processors coupled to the memory and the one or more input devices, the method comprising: while operating in a mode configured for a first user, receiving, using the one or more input devices, an input corresponding to a request to operate in a mode for another user; and determining whether user registration data for a second user, different from the first user, is available from a second electronic device; in accordance with a determination that user registration data for the second user is available from a second electronic device: receiving, from the second electronic device, the user registration data for the second user; and operating in a mode configured for the second user using the registration data for the second user.

Some examples of the disclosure are directed to a non-transitory computer readable storage medium storing instructions, that when executed by an electronic device that includes memory, one or more input devices, and one or more processors coupled to the memory and the one or more input devices causes the electronic device to: while operating in a mode configured for a first user, receive, using the one or more input devices, an input corresponding to a request to operate in a mode for another user; and determine whether user registration data for a second user, different from the first user, is available from a second electronic device; in accordance with a determination that user registration data for the second user is available from a second electronic device: receive, from the second electronic device, the user registration data for the second user; and operate in a mode configured for the second user using the registration data for the second user.

What is claimed is:

1. An electronic device, comprising:
memory;
one or more input devices; and
one or more processors coupled to the memory and the one or more input devices, the one or more processors configured to:
while operating in a mode configured for a first user, receive, using the one or more input devices, an input corresponding to a request to operate in a mode for another user; and
determine whether user registration data for a second user, different from the first user, is available from a second electronic device, wherein determining that the user registration data for the second user is available from the second electronic device includes detecting the second electronic device using ultra-wide band (UWB);
in accordance with a determination that user registration data for the second user is available from the second electronic device:
receive, from the second electronic device, the user registration data for the second user; and
operate in a mode configured for the second user using the user registration data for the second user.

2. The electronic device of claim 1, wherein the one or more processors are further configured to:
in accordance with a determination that the user registration data for the second user is not available from the second electronic device, creating the user registration data for the second user.

3. The electronic device of claim 2, wherein creating the user registration data for the second user includes sensing eye positions of the second user and calibrating a display using the sensed eye positions.

4. The electronic device of claim 1, wherein the user registration data of the second user comprises data used to process hand gesture inputs, and operating in the mode configured for the second user includes detecting a hand gesture input using the data used to process the hand gesture inputs.

5. The electronic device of claim 1, further comprising a display device coupled to the one or more processors, wherein the user registration data of the second user includes pupil distance settings for the second user, and operating in the mode configured for the second user includes adjusting the display device based on the pupil distance settings for the second user.

6. The electronic device of claim 1, wherein transitioning between the mode configured for the first user and the mode configured for the second user occurs while a game application is running on the electronic device, and the one or more processors are further configured to, while running the game application on the electronic device:
in accordance with a determination that it is the first user's turn in the game application, operate in the mode configured for the first user, and
in accordance with a determination that it is the second user's turn in the game application, operate in the mode configured for the second user.

7. A method performed at an electronic device including memory, one or more input devices, and one or more processors coupled to the memory and the one or more input devices, the method comprising:
while operating in a mode configured for a first user, receiving, using the one or more input devices, an input corresponding to a request to operate in a mode for another user; and
determining whether user registration data for a second user, different from the first user, is available from a second electronic device, wherein determining that the user registration data for the second user is available from the second electronic device includes detecting the second electronic device touching the electronic device using one or more sensors of the electronic device;
in accordance with a determination that user registration data for the second user is available from the second electronic device:

receiving, from the second electronic device, the user registration data for the second user; and operating in a mode configured for the second user using the user registration data for the second user.

8. The method of claim 7, wherein the one or more processors are further configured to:

in accordance with a determination that the user registration data for the second user is not available from the second electronic device, creating the user registration data for the second user.

9. The method of claim 8, wherein creating the user registration data for the second user includes sensing eye positions of the second user and calibrating a display using the sensed eye positions.

10. The method of claim 7, wherein the user registration data of the second user comprises data used to process hand gesture inputs, and operating in the mode configured for the second user includes detecting a hand gesture input using the data used to process the hand gesture inputs.

11. The method of claim 7, wherein the user registration data of the second user includes pupil distance settings for the second user, and operating in the mode configured for the second user includes adjusting a display device based on the pupil distance settings for the second user.

12. The method of claim 7, wherein transitioning between the mode configured for the first user and the mode configured for the second user occurs while a game application is running on the electronic device, and the method further comprises, while running the game application on the electronic device:

in accordance with a determination that it is the first user's turn in the game application, operating in the mode configured for the first user, and in accordance with a determination that it is the second user's turn in the game application, operating in the mode configured for the second user.

13. A non-transitory computer readable storage medium storing instructions, that when executed by an electronic device that includes memory, one or more input devices, and one or more processors coupled to the memory and the one or more input devices causes the electronic device to:

while operating in a mode configured for a first user, receive, using the one or more input devices, an input corresponding to a request to operate in a mode for another user; and determine whether user registration data for a second user, different from the first user, is available from a second electronic device, wherein:

in accordance with a determination that user registration data for the second user is available from the second electronic device:

receive, from the second electronic device, the user registration data for the second user;

operate in a mode configured for the second user using the user registration data for the second user;

while operating in the mode configured for the first user, detect, using one or more sensors, removal of a wearable device from the second user; and in response to detecting removal of the wearable device from the second user, transition from operating in the mode configured for the second user to operating in the mode configured for the first user.

14. The non-transitory computer readable storage medium of claim 13, wherein the instructions, when executed by the electronic device, further cause the electronic device to:

in accordance with a determination that the user registration data for the second user is not available from the second electronic device, create the user registration data for the second user.

15. The non-transitory computer readable storage medium of claim 14, wherein creating the user registration data for the second user includes sensing eye positions of the second user and calibrating a display using the sensed eye positions.

16. The non-transitory computer readable storage medium of claim 13, wherein the user registration data of the second user comprises data used to process hand gesture inputs, and operating in the mode configured for the second user includes detecting a hand gesture input using the data used to process the hand gesture inputs.

17. The non-transitory computer readable storage medium of claim 13, wherein the user registration data of the second user includes pupil distance settings for the second user, and operating in the mode configured for the second user includes adjusting a display device based on the pupil distance settings for the second user.

18. The non-transitory computer readable storage medium of claim 13, wherein transitioning between the mode configured for the first user and the mode configured for the second user occurs while a game application is running on the electronic device, and the instructions, when executed by the electronic device, further cause the electronic device to, while running the game application on the electronic device:

in accordance with a determination that it is the first user's turn in the game application, operate in the mode configured for the first user, and in accordance with a determination that it is the second user's turn in the game application, operate in the mode configured for the second user.

* * * * *